United States Patent
Liang et al.

(10) Patent No.: US 10,724,586 B2
(45) Date of Patent: Jul. 28, 2020

(54) MOVABLE TUNNEL BRAKING SYSTEM AND PASSENGER BOARDING BRIDGE

(71) Applicants: CHINA INTERNATIONAL MARINE CONTAINERS (GROUP) LTD., Shenzhen, Guangdong (CN); SHENZHEN CIMC-TIANDA AIRPORT SUPPORT LTD, Shenzhen, Guangdong (CN)

(72) Inventors: Lexian Liang, Guangdong (CN); Shaomin Chang, Guangdong (CN); Lei Shi, Guangdong (CN); Yunjian Yao, Guangdong (CN)

(73) Assignees: China International Marine Containers (Group) Ltd., Shenzhen, Guangdong (CN); Shenzhen CIMC-Tianda Airport Support Ltd., Shenzhen, Guangdong (CN)

( * ) Notice: Subject to any disclaimer, the term of this patent is extended or adjusted under 35 U.S.C. 154(b) by 0 days.

(21) Appl. No.: 16/330,915

(22) PCT Filed: Apr. 20, 2017

(86) PCT No.: PCT/CN2017/081263
§ 371 (c)(1),
(2) Date: Apr. 25, 2019

(87) PCT Pub. No.: WO2018/045757
PCT Pub. Date: Mar. 15, 2018

(65) Prior Publication Data
US 2020/0124120 A1  Apr. 23, 2020

(30) Foreign Application Priority Data

Sep. 6, 2016  (CN) .......................... 2016 1 0810478

(51) Int. Cl.
*B64F 1/305* (2006.01)
*F16D 63/00* (2006.01)
*E01D 15/12* (2006.01)

(52) U.S. Cl.
CPC ............ *F16D 63/006* (2013.01); *B64F 1/305* (2013.01); *E01D 15/124* (2013.01); *F16D 63/008* (2013.01)

(58) Field of Classification Search
CPC ...... B64F 1/305; E01D 15/124; F16D 63/006; F16D 63/008
(Continued)

(56) References Cited

U.S. PATENT DOCUMENTS 3,693,204 A * 9/1972 Eggert, Jr. ............. B64F 1/305
14/71.5
3,722,017 A * 3/1973 Gacs ..................... B64F 1/3055
14/71.5
(Continued)

FOREIGN PATENT DOCUMENTS

CN  201610222 U  10/2010
CN  101903248 A  12/2010
(Continued)

OTHER PUBLICATIONS

Chinese Office Action dated Mar. 23, 2020 in connection with Chinese Patent Application No. 201610810478.X.
(Continued)

*Primary Examiner* — Raymond W Addie
(74) *Attorney, Agent, or Firm* — Amster, Rothstein & Ebenstein LLP

(57) ABSTRACT

A passenger boarding bridge having a movable tunnel and braking system includes a brake plate, a brake pin and a triggering device. The brake plate is fixedly disposed at a first tunnel of the plurality of tunnels, and the brake plate is
(Continued)

provided with a plurality of brake slots. The brake pin is movably disposed at a second tunnel of the plurality of tunnels, which is sleeve-connected with the first tunnel and can be combined with the brake slot. The triggering device includes a mechanical blocking portion, a linkage mechanism and a tensile spring. The mechanical blocking portion is fixedly disposed at the second tunnel. When the tensile wire rope or the retracting wire rope is broken, the linkage mechanism is driven to move and drives the brake pin to combine with the brake slot, to brake the first tunnel and the second tunnel.

12 Claims, 5 Drawing Sheets

(58) Field of Classification Search
    USPC .......................................................... 14/71.5
    See application file for complete search history.

(56) References Cited

U.S. PATENT DOCUMENTS

| | | | | |
|---|---|---|---|---|
| 3,859,481 | A * | 1/1975 | Sprague | B64F 1/305 |
| | | | | 191/12 R |
| 4,222,140 | A * | 9/1980 | Olewinski | E01D 15/24 |
| | | | | 14/71.3 |
| 4,344,200 | A * | 8/1982 | Farr | B64F 1/305 |
| | | | | 14/71.5 |
| 6,678,910 | B2 | 1/2004 | Smith | |
| 8,266,750 | B2 * | 9/2012 | Peterson | B64F 1/305 |
| | | | | 14/71.5 |
| 8,302,237 | B2 * | 11/2012 | Shimizu | B64F 1/3055 |
| | | | | 14/71.5 |

FOREIGN PATENT DOCUMENTS

| | | |
|---|---|---|
| CN | 201777388 U | 3/2011 |
| CN | 104260898 A | 1/2015 |
| CN | 204415745 U | 6/2015 |
| CN | 205396576 U | 7/2016 |
| CN | 106 428 611 A | 2/2017 |
| CN | 206 141 864 U | 5/2017 |
| DE | 2701634 A1 | 7/1978 |
| JP | 5759299 B2 | 8/2015 |

OTHER PUBLICATIONS

Communication European Supplementary Search Report dated Apr. 30, 2020 in connection with European Patent Application No. 17847931.7.

* cited by examiner

MOVABLE TUNNEL BRAKING SYSTEM AND PASSENGER BOARDING BRIDGE

CROSS-REFERENCE TO RELATED APPLICATIONS

The present application is based on and claims priority to Chinese Application No. 201610810478.X, filed on Sep. 6, 2016, entire contents of which is hereby incorporated by reference.

TECHNICAL FIELD

The present disclosure relates to a movable tunnel braking system, and also relates to a passenger boarding bridge having the movable tunnel braking system.

BACKGROUND

Referring to FIG. 1 and FIG. 2, FIG. 1 is a schematic view of a passenger boarding bridge, and FIG. 2 is a principle schematic view of an existing passenger boarding bridge. The existing passenger boarding bridge generally includes three tunnels that are sleeve-connected with one another in turn. The three tunnels are a tunnel A 21, a tunnel B 22, and a tunnel C 23, respectively. The tunnel A 21 is hinged to the rotunda 1. The rotunda 1 is fixed on the ground by a column under the turntable 1. The tunnel C 23 is connected to a lifting column 3. The lifting column 3 is connected to a horizontal drive unit 4. The horizontal drive unit 4 drives the tunnel C forward or backward. The tunnel B 22 is sleeved between the tunnel A 21 and the tunnel C 23.

As shown in FIG. 2, a first movable pulley 221 and a second movable pulley 222 are fixed on the bottom of the tunnel B 22. The retracting wire rope 51 has one end fixed to a tailing end of the tunnel A 21, the other end fixed to a tailing end of the tunnel C 23, and a center portion passing through the second movable pulley 222. The tunnel A 21, the tunnel B 22, the tunnel C 23, the retracting wire rope 51 and the second movable pulley 222 form one set of movable pulley mechanism. The tensile wire rope 52 has one end fixed to a leading end of the tunnel A 21, the other end fixed to a tailing end of the tunnel C 23, and the center portion passing through the first movable pulley 221. The tunnel A 21, the tunnel B 22, the tunnel C 23, the tensile wire rope 52 and the first movable pulley 221 form the other set of movable pulley mechanism. It is realized that the tunnel B 22 and the tunnel C 23 synchronous move through the two sets of movable pulley mechanisms at the three tunnels.

The passenger boarding bridge may be used in the airport for passengers to board on the airplane. After the tunnel C 23 docks with an aircraft, the passenger can enter the passenger boarding bridge through the turntable 1, then pass through the tunnel A 21, the tunnel B 22 and the tunnel C 23 in turn, and finally enter the airplane. Of course, the passenger boarding bridge may also be installed on ferry ports for passengers to board on a ship. Thus, the passenger boarding bridge may also be called a boarding bridge or other names.

In use, the retracting wire rope 51 and the tensile wire rope 52 may be broken, and the passenger boarding bridge is not in a horizontal state under many circumstances, if the retracting wire rope 51 or the tensile wire rope 52 is broken, the tunnel B 22 will move uncontrolledly which results safety hazards. It is necessary to be able to brake the tunnel B 22 under the circumstance that the wire rope is broken, in order to ensure the safety of personnel in the tunnel. The existing tunnel braking system has a complicated structure and low reliability.

It should be noted that the Background portion contains the contents which are merely used to reinforce understanding of the background technology of the present disclosure, and thus may include information that does not constitute the prior art as already known by an ordinary person skilled in the art.

SUMMARY

An object of the present disclosure is to overcome the above-mentioned shortcomings of the prior art. It is provided with a movable tunnel braking system that may brake two tunnels adjacent to each other when the tensile wire rope or the retracting wire rope is broken. The movable passage braking system has a simple structure and high reliability.

Another object of the present disclosure is to provide a passenger boarding bridge having the movable tunnel braking system.

Additional aspects and advantages of the disclosure will be in part set forth in the description below, and in part will become obvious from the description, or may be learned from practice of the present disclosure.

According to one aspect of the present disclosure, a movable tunnel braking system for a passenger boarding bridge. The passenger boarding bridge includes a plurality of tunnels that are sequentially sleeve-connected with one another, and a tensile wire rope and a retracting wire rope that are connected to the plurality of the tunnels. Wherein the movable tunnel braking system includes a brake plate, a brake pin and a triggering device. The brake plate is fixedly disposed at a first tunnel of the plurality of tunnels, and the brake plate is provided with a plurality of brake slots; the brake pin that is movably disposed at a second tunnel of the plurality of tunnels, which is sleeve-connected with the first tunnel and can be combined with the brake slot; and the triggering device includes a mechanical blocking portion, a linkage mechanism and a tensile spring, the mechanical blocking portion is fixedly disposed at the second tunnel; the linkage mechanism is movably disposed at the second tunnel, and is connected to one end of the tensile wire rope or the retracting wire rope, and the linkage mechanism abuts against the mechanical blocking portion under action of a tension of the tensile wire rope or the retracting wire rope; and the tensile spring that has two ends respectively connected to the linkage mechanism and the second tunnel, so that when the tensile wire rope or the retracting wire rope is broken, the linkage mechanism is driven to move and drives the brake pin to combine with the brake slot, to brake the first tunnel and the second tunnel.

According to one embodiment of the present disclosure, the brake pin is hinged to the second tunnel; two brake pins and two triggering devices are provided; the two linkage mechanisms of the two triggering devices are connected to one end of the tensile wire rope and the retracting wire rope, respectively; and the two linkage mechanisms of the two triggering devices are connected to one of the brake pins, respectively.

According to one embodiment of the present disclosure, the brake pin is hinged to the second tunnel; the second tunnel is provided with a positioning spring that provides a pulling force for the brake pin to disconnect the brake pin from the brake slot; the triggering device is provided with two; the two linkage mechanisms of the two triggering devices are connected to one end of the tensile wire rope and the retracting wire rope, respectively; and the two linkage mechanisms of the two triggering devices are connected to the same brake pin.

According to one embodiment of the present disclosure, the linkage mechanism includes:

a first hinged seat that is fixedly disposed at the second tunnel;

a first hinged rod that is connected to the tensile wire rope or the retracting wire rope;

a second hinged rod that has one end hinged to the first hinged seat and the other end hinged to the first hinged rod and capable of abutting against the mechanical blocking portion, the tensile spring being connected to the second hinged rod;

a third hinged rod having one end hinged to the first hinged seat;

a fourth hinged rod having two ends respectively hinged to the third hinged rod and the brake pin; wherein, the second hinged rod can be rotated by a certain angle to drive the third hinged rod to rotate, such that the third hinged rod drives the fourth hinged rod to move, and the fourth hinged rod drive the brake pin to combine with the brake slot.

According to one embodiment of the present disclosure, wherein the certain angle is in a range of 5° to 30°.

According to one embodiment of the present disclosure, the linkage mechanism includes:

a main hinged rod that has one end coaxially hinged with the brake pin and the other end in contact with the mechanical blocking portion, and the main hinged rod being connected to the tensile spring;

an intermediate hinged shaft that is hinged to the main hinged rod;

a connecting bolt that has one end connected to the tensile wire rope or the retracting wire rope and the other end connected to the intermediate hinged shaft.

According to one embodiment of the present disclosure, the main hinged rod includes a body and a connecting handle disposed at one end of the body; the connecting handle is coaxially hinged with the brake pin; the body can be rotated by a certain angle to contact with the brake pin so as to drive the brake pin to be combined with the brake slot.

According to one embodiment of the present disclosure, wherein the certain angle is in a range of 5° to 30°.

According to one embodiment of the present disclosure, the brake slot is a waist-shaped slot, a circular slot, a square slot, a trapezoidal slot or a V-shaped slot.

According to one embodiment of the present disclosure, the movable tunnel braking system further includes a travel switch for detecting whether the brake pin is combined with the brake slot.

According to another aspect of the present disclosure, a passenger boarding bridge including the movable tunnel braking system is provided. The passenger boarding bridge includes a plurality of tunnels that are sequentially sleeve-connected with one another, and a tensile wire rope and a retracting wire rope that are connected to the plurality of the tunnels. Wherein the movable tunnel braking system includes a brake plate, a brake pin and a triggering device. The brake plate is fixedly disposed at a first tunnel of the plurality of tunnels, and the brake plate is provided with a plurality of brake slots; the brake pin that is movably disposed at a second tunnel of the plurality of tunnels, which is sleeve-connected with the first tunnel and can be combined with the brake slot; and the triggering device includes a mechanical blocking portion, a linkage mechanism and a tensile spring, the mechanical blocking portion is fixedly disposed at the second tunnel; the linkage mechanism is movably disposed at the second tunnel, and is connected to one end of the tensile wire rope or the retracting wire rope, and the linkage mechanism abuts against the mechanical blocking portion under action of a tension of the tensile wire rope or the retracting wire rope; and the tensile spring that has two ends respectively connected to the linkage mechanism and the second tunnel, so that when the tensile wire rope or the retracting wire rope is broken, the linkage mechanism is driven to move and drives the brake pin to combine with the brake slot, to brake the first tunnel and the second tunnel.

According to one embodiment of the present disclosure, the passenger boarding bridge has three tunnels.

It can be seen from the technical solutions as above described that the advantages and advantageous effects of the present disclosure are as follows:

The movable tunnel braking system of the present disclosure brakes two adjacent tunnels of the passenger boarding bridge by a brake plate, a brake pin and a triggering device. The movable tunnel braking system has a simple and compact structure and is installed conveniently. And the movable tunnel braking system of the present disclosure may be realized completely by means of the mechanical structure, due to extremely high action reliability, can brake the movable tunnel effectively when the tensile wire rope or the retracting wire rope is broken, thereby ensuring the safety of passenger.

BRIEF DESCRIPTION OF THE DRAWINGS

The foregoing and other features and advantages of the present disclosure will become more apparent from the following detailed description of the present disclosure when taken in conjunction with the accompanying drawings.

DETAILED DESCRIPTION

Now, the exemplary embodiments will be described more fully with reference to the accompany drawings. However, the exemplary embodiments can be implemented in various forms and should not be construed as limited to the embodiments set forth herein. Instead, these embodiments are provided so that this disclosure will be thorough and complete, and the concept of the exemplary embodiment will fully conveyed to those skilled in the art. Same reference signs denote the same or similar structures in the accompany drawings, and thus the detailed description thereof will be omitted.

Figure 1:
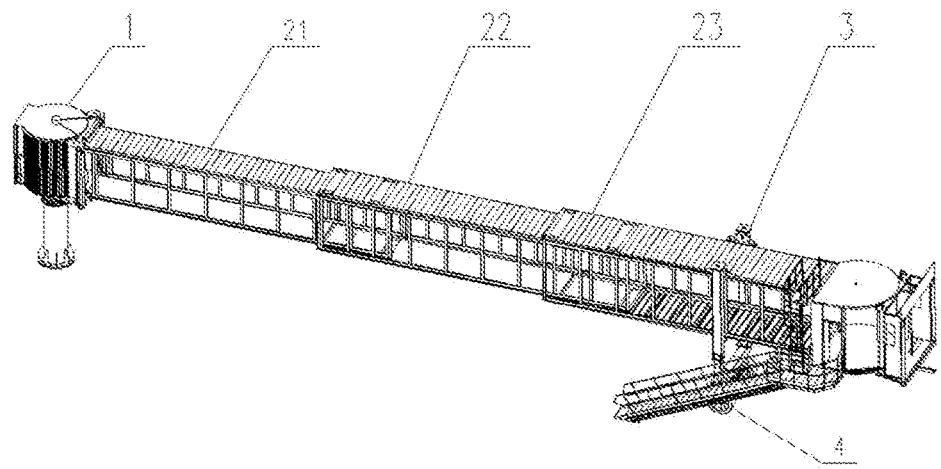
FIG. 1 is a schematic view of an existing passenger boarding bridge.
Figure 2:
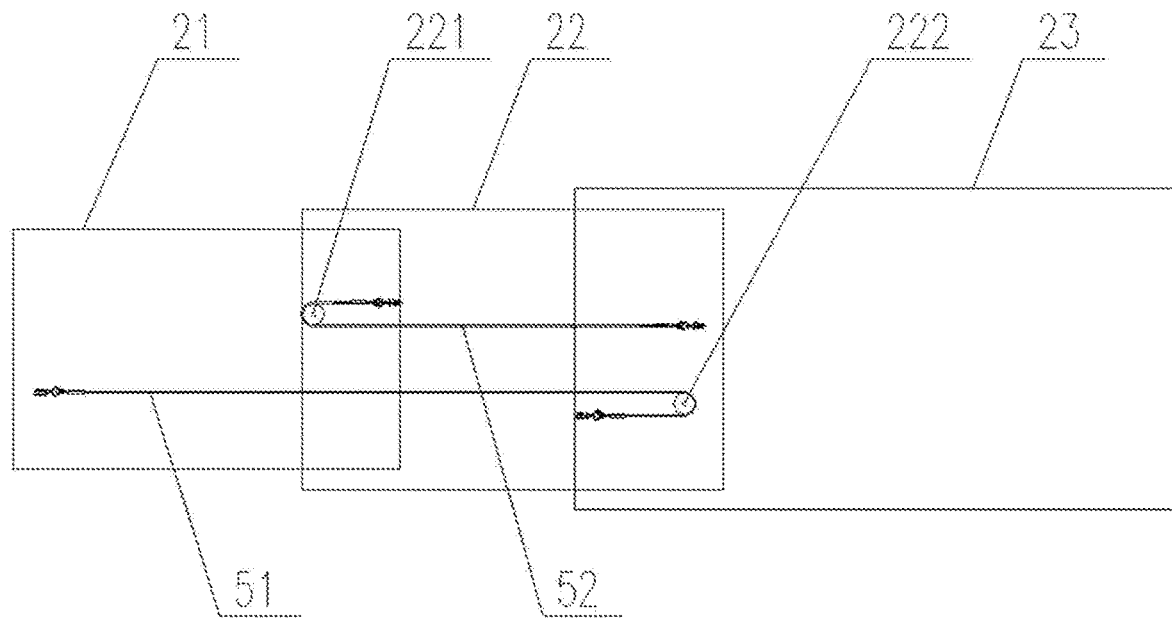
FIG. 2 is a principle schematic view of an existing passenger boarding bridge.
Figure 3:
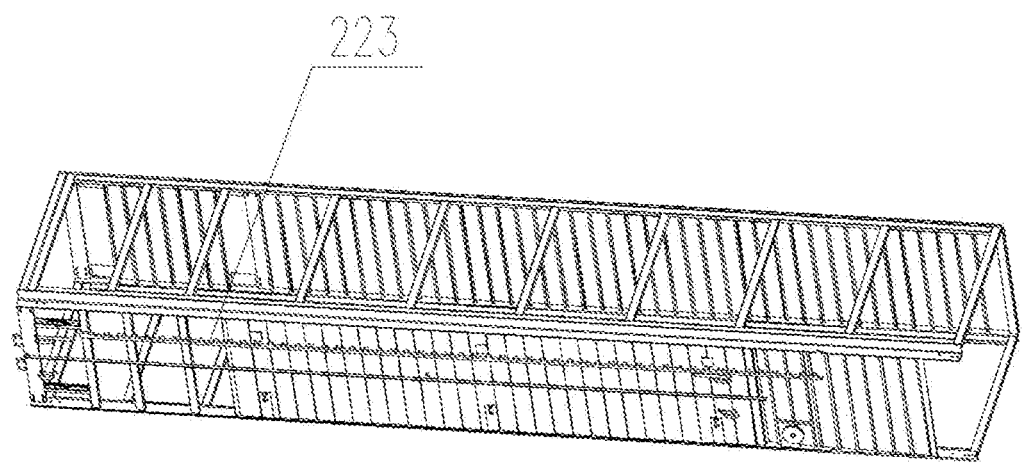
FIG. 3 is a schematic view schematic the bottom structure of a tunnel B in the present disclosure.
Figure 4:
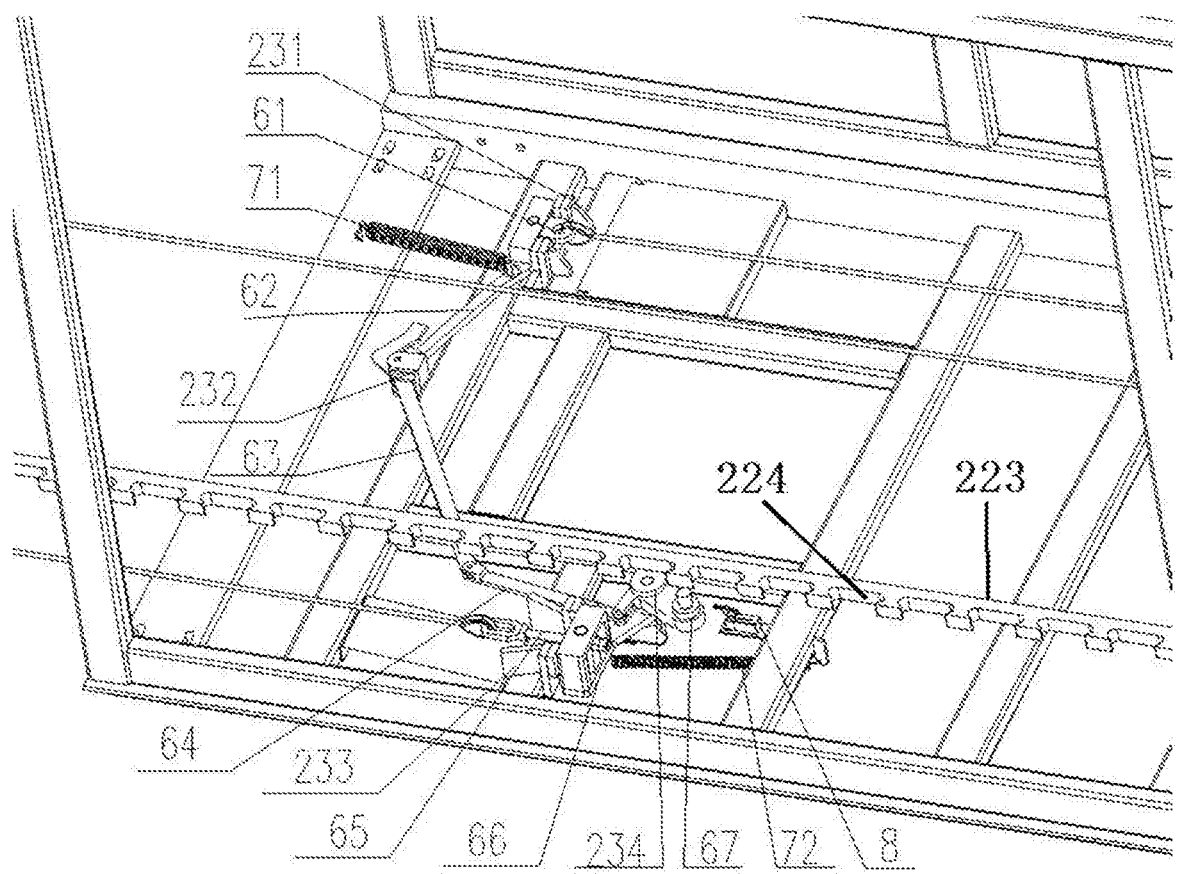
FIG. 4 is a schematic view of a movable tunnel braking system according to the embodiment of the present disclosure.

Referring to FIG. 3 and FIG. 4, an embodiment of the present disclosure discloses a movable tunnel braking system. The movable tunnel braking system is used for a passenger boarding bridge shown in FIG. 1 and FIG. 2, wherein the passenger boarding bridge includes a plurality of tunnels that are sequentially sleeve-connected with one another, and a tensile wire rope 52 and a retracting wire rope 51 that are connected to the plurality of tunnels. The movable tunnel braking system includes a brake plate 223, a brake pin 67, and a triggering device, wherein the brake plate 223 is fixedly disposed at a first tunnel, and the brake pin 67 is movably disposed at a second tunnel that is sleeve-connected with the first tunnel.

In this embodiment, the first tunnel is a tunnel B 22, and the second tunnel is a tunnel C 23. However, it should be noted that the "first tunnel" and the "second tunnel" in this embodiment are merely used to indicate one of two tunnels that are adjacent and sleeve-connected with each other, but not limit the tunnel. For example, in other embodiments of the present disclosure, the first tunnel may also represent the tunnel C 23 and the second tunnel is the tunnel B 22. At the same time, the number of tunnels of the passenger boarding bridge is not limited to two, but may also be three or more.

Referring to FIG. 4, the brake plate 223 is substantially an elongated strip-shaped steel sheet, on which a plurality of brake slots 224 are disposed. In this embodiment, the structure of the brake slot 224 is substantially a waist-shaped hole. However, it should be appreciated for the person skilled in the art that the structure of the brake slot 224 is merely exemplary, but not limit to the specific structure. In the other embodiments of the present disclosure, the brake slot 224 may also be a circular slot, a square slot, a trapezoidal slot or a V-shaped slot and the other shapes.

The brake pin 67 may be used to combine with the brake slot 224 at the brake plate 223. That is to say, the brake pin 67 may be protruded into the brake slot 224 to combine with the brake slot 224 together, in this way, the relative movement between the first tunnel and the second tunnel may be restricted, so as to ensure the safety of people in the tunnel. The brake pin 67 may be triggered by a triggering device to perform the corresponding action of combining with the brake slot 224. It should be understood by the person skilled in the art that for the present disclosure, the specific action modes of the brake pin 67 are not limited. For example, the brake pin 67 may be slidably disposed at the second tunnel, and may slide into the brake slot 224. In this embodiment, the brake pin 67 is hinged to the second tunnel, by rotating the brake pin 67, a distal end of the brake pin 67 may enter into the brake slot 224.

Referring to FIG. 4 to FIG. 10, the triggering device includes a mechanical blocking portion, a linkage mechanism, and a tensile spring. The mechanical blocking portion is fixedly disposed at the second tunnel. The linkage mechanism is movably disposed at the second tunnel, and connected to one end of the tensile wire rope 52 or the retracting wire rope 51. The linkage mechanism abuts against the mechanical blocking portion under the action of a tensile force of the tensile wire rope 52 or the retracting wire rope 51. The two ends of the tensile spring are respectively connected to the linkage mechanism and the second tunnel, so that when the tensile wire rope 52 or the retracting wire rope 51 is broken, the linkage mechanism is driven to move and drives the brake pin 67 to combine with the brake slot 224, to brake the first tunnel and the second tunnel.

Furthermore, the triggering device will be described in detail. For the movable tunnel braking system of the present disclosure, the number of the brake pin 67 and the triggering device may be adjusted as needed. In one embodiment of the present disclosure, the brake pin 67 and the triggering device each may be configured in two, and the linkage mechanisms of the two triggering devices are respectively connected to the tensile wire rope 52 and the retracting wire rope 51. The linkage mechanism of each of the triggering devices is connected to one of the brake pins 67.

In another embodiment of the present disclosure, the number of the brake pin 67 and the triggering device may be only one, so that the linkage mechanism of the triggering device is connected to the tensile wire rope 52 or the retracting wire rope 51. One set of movable tunnel braking system may detect breakage of the tensile wire rope 52 or the retracting wire rope 51. Two sets of the movable tunnel braking systems may be provided to detect the state of the tensile wire rope 52 and the retracting wire rope 51.

Figure 5:
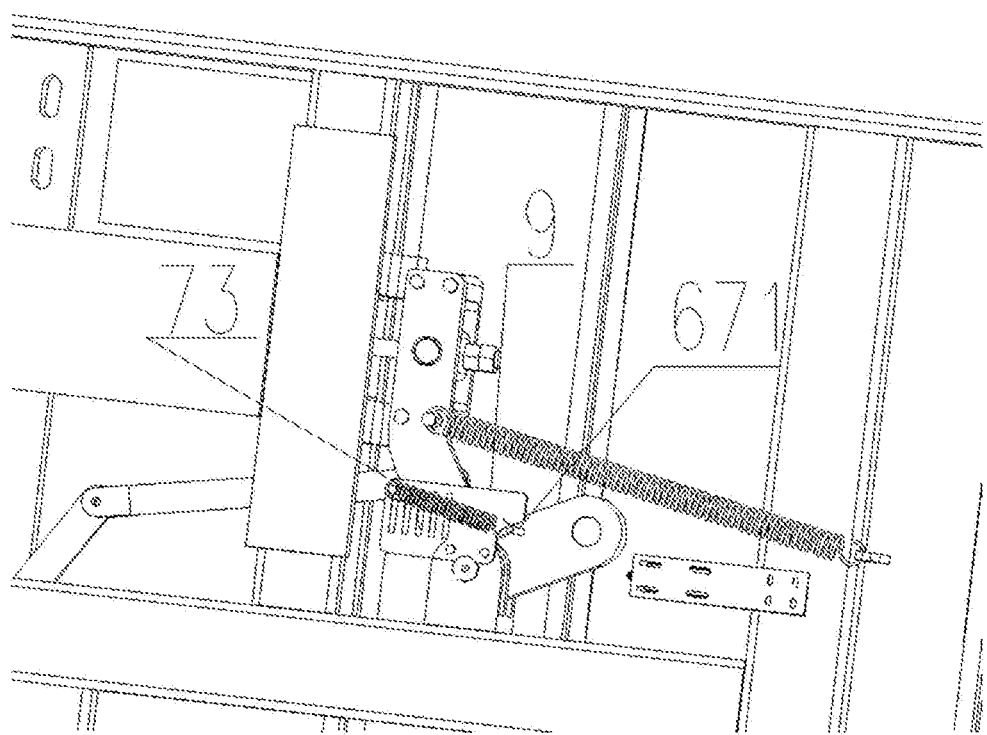
FIG. 5 is a schematic view showing the bottom structure of a tunnel C in the embodiment of the present invention.

In this embodiment, the number of the triggering devices is two. The linkage mechanisms of the two triggering devices are respectively connected to one end of the tensile wire rope 52 and the retracting wire rope 51. And the two linkage mechanisms are also connected to the same brake pin 67. In this way, the tensile wire rope 52 and the retracting wire rope 51 may be detected, and may be broken by the action of one brake pin 67, to improve reliability of the action while reducing the number of the parts. Referring to FIG. 4 and FIG. 5, in this embodiment, one second hinged seat 234 is disposed at the second tunnel, and the brake pin 67 is hinged on the second hinged seat 234. A positioning spring 73 for providing a tension for the brake pin 67 is provided at the second tunnel, wherein a positioning stop plate 9 is provided on the second hinged seat 234, a striking rod 671 is provided at the brake pin 67, and the two ends of the positioning spring 73 are respectively connected to the striking rod 671 and the positioning stop plate 9. The positioning spring 73 may disengage the brake pin 67 from the brake slot 224, that is, under the action of the tension of the positioning spring 73, the striking rod 671 is in contact with the positioning stop plate 9, so that the brake pin 67 may be positioned at a place that is disengaged away from the brake slot 224. In this place, the brake pin 67 does not affect the movement between the first tunnel and the second tunnel. Only when the tensile wire rope 52 or the retracting wire rope 51 is broken, the brake pin 67 will be driven by the triggering device to overcome the function of a tension force of the positioning spring 73 to combine with the brake slot 224.

Referring to FIG. 4, the configuration of the linkage mechanism in the embodiment of the present disclosure will be further described. In this embodiment, the linkage mechanism presents two structures, wherein the linkage mechanism with a first structure is presented as follows: the linkage mechanism includes a first hinged seat 232, a first hinged rod 61, a second hinged rod 62, a third hinged rod 63, and a fourth hinged rod 64. The first hinged seat 232 is fixedly disposed at the second tunnel. The first hinged rod 61 has one end connected to the tensile wire rope 52 or the retracting wire rope 51, and the other end hinged to the second hinged rod 62. The second hinged rod 62 has one end hinged to the first hinged seat 232 and the other end used to hinge to the first hinged rod 61 and abut against a mechanical blocking portion 231. The third hinged rod 63 has one end hinged to the first hinged seat 232. Both ends of the fourth hinged rod 64 are hinged to the third hinged rod 63 and the brake pin 67, respectively. The second hinged rod 62 is connected to one end of a tensile spring 71. The other end of the tensile spring 71 is connected to the second tunnel. After the second hinged rod 62 is rotated by a certain angle a, the third hinged rod 63 may be driven to rotate to drive the fourth hinged rod 64 to move, and finally the fourth hinged rod 64 drives the brake pin 67 to combine with the brake slot 224. The second hinged rod 62 rotates at a certain angle a of 5°, that is to say, when the second hinged rod 62 rotates with an angle less than 5°, the third hinged rod 63 is not rotated, and thereby avoiding false operation. In this embodiment, the linkage mechanism with the first structure is used to connect the retracting wire rope 51, but it should be noted that the linkage mechanism with the first structure may also be used to connect the tensile wire rope 52.

Figure 6:
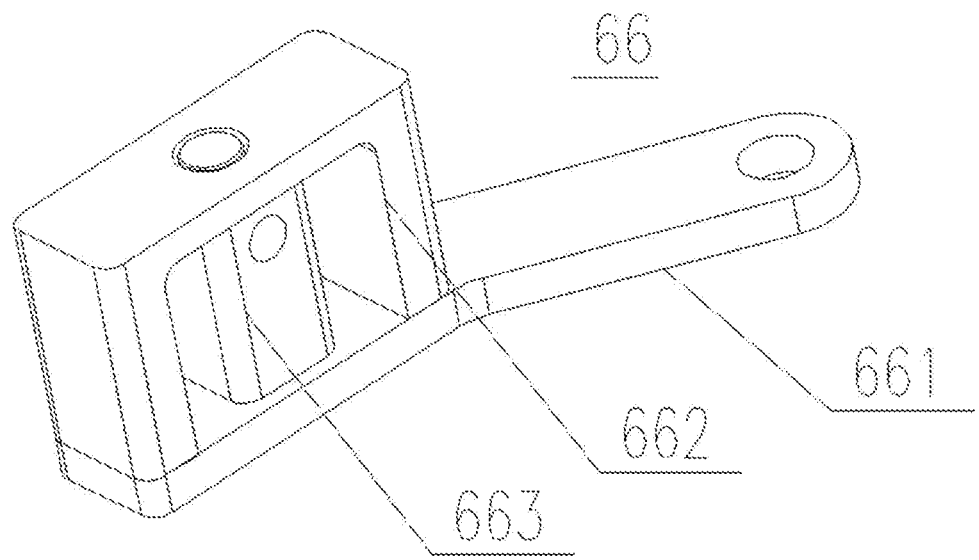
FIG. 6 is a schematic structural view of a main hinged rod in the embodiment of the present disclosure.

Referring to FIG. 4 and FIG. 6, a linkage mechanism with the second structure is presented as follows: the linkage mechanism includes a main hinged rod 66, an intermediate hinged shaft 663, and a connecting bolt 65. The main hinged rod 66 has one end that is coaxially hinged with the brake pin 67, and the other end that is in contact with a mechanical blocking portion 233. The main hinged rod 66 is also connected to a tensile spring 72 disposed at the second tunnel. The intermediate hinged shaft 663 is hinged to the main hinged rod 66. The connecting bolt 65 has one end that is connected to the tensile wire rope 52 or the retracting wire rope 51, and the other end that is connected to the intermediate hinged shaft 663. That is to say, only one main hinged rod 66 may be used, to simplify the structure of the linkage mechanism. Further, referring to FIG. 6, the main hinged rod 66 includes a body 664 and a connecting handle 661 disposed at one end of the body 664. The connecting handle 661 is coaxially hinged with the brake pin 67. The body is rotated by a certain angle b to contact with the brake pin 67 so as to drive the brake pin 67 to combine with the brake slot 224. A fixing cover 662 is also fixedly connected to the body. The intermediate hinged shaft 663 is hinged between the fixing cover 662 and the body. The main hinged rod 66 is rotated by a certain angle b of 5°, that is to say, when the main hinged rod 66 rotates with an angle less than 5°, the brake pin 67 is not rotated, and thereby avoiding false operation. In this embodiment, the main hinged rod 66 of the second linkage mechanism is connected to the tensile wire rope 52, however, it should be noted that the second linkage mechanism may also be used on the retracting wire rope 51. The linkage mechanisms with the two structures as above mentioned may be used independently or together. In this embodiment, the first linkage mechanism and the second linkage mechanism are simultaneously used.

Figure 7:
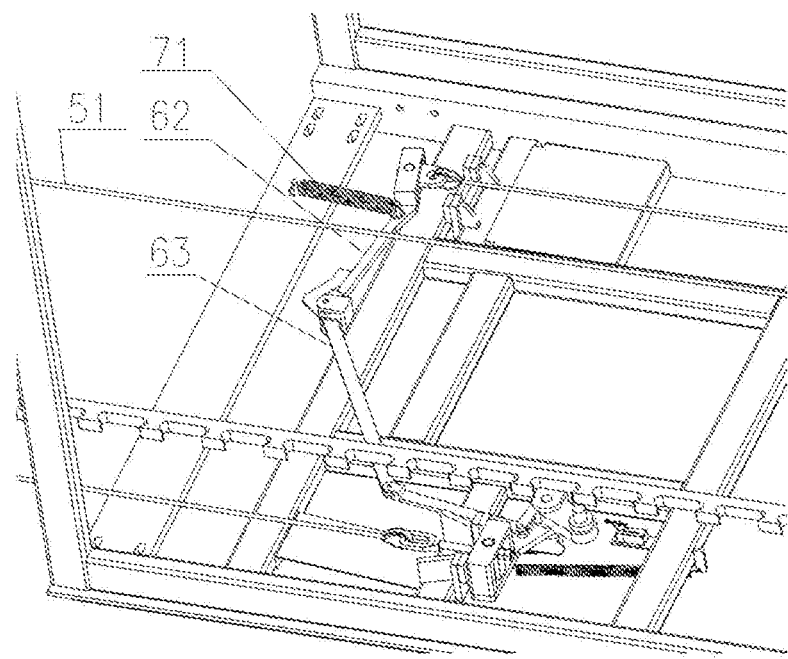
FIG. 7 is a schematic view of the retracting wire rope being relaxed.

Referring to FIG. 7, when the tensile wire rope 52 is in a tensioned state, the retracting wire rope 51 may be in a certain relaxed state under some working conditions, but the retracting wire rope 51 is not broken, and thereby does not need to brake. At this time, although the tensile spring 71 may rotate the second hinged rod 62, the rotational angle of the second hinged rod 62 does not exceed the range of the angle a, so that the second hinged rod 62 may not rotate the third hinged rod 63, and thereby avoiding accidental combination between the brake pin 67 and the brake slot 224 on the brake plate 223 to ensures security.

Figure 8:
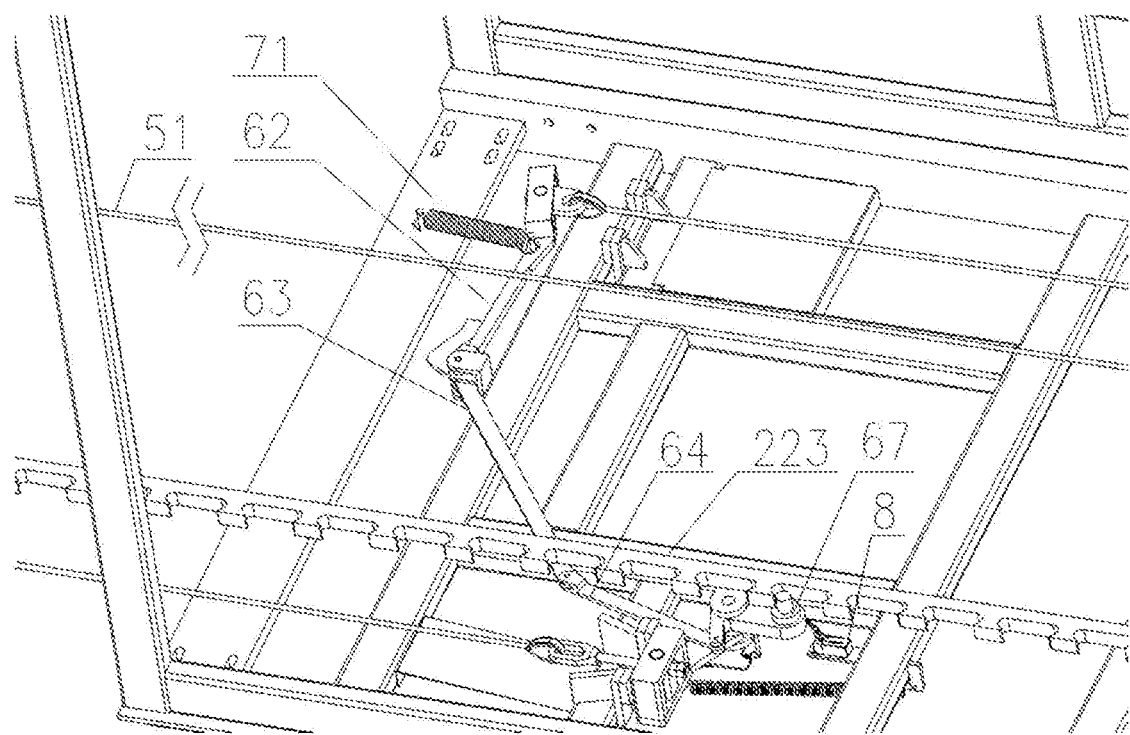
FIG. 8 is a schematic view of the retracting wire rope being broken.

Referring to FIG. 8, when the retracting wire rope 51 is broken, the tensile spring 71 drives the second hinged rod 62 to rotate beyond the range of the angle a, so that the second hinged rod 62 may drive the third hinged rod 63 to start rotating, and finally the brake pin 67 is combined together with the brake slot 224 at the brake plate 223 to brake the first tunnel and the second tunnel.

Figure 9:
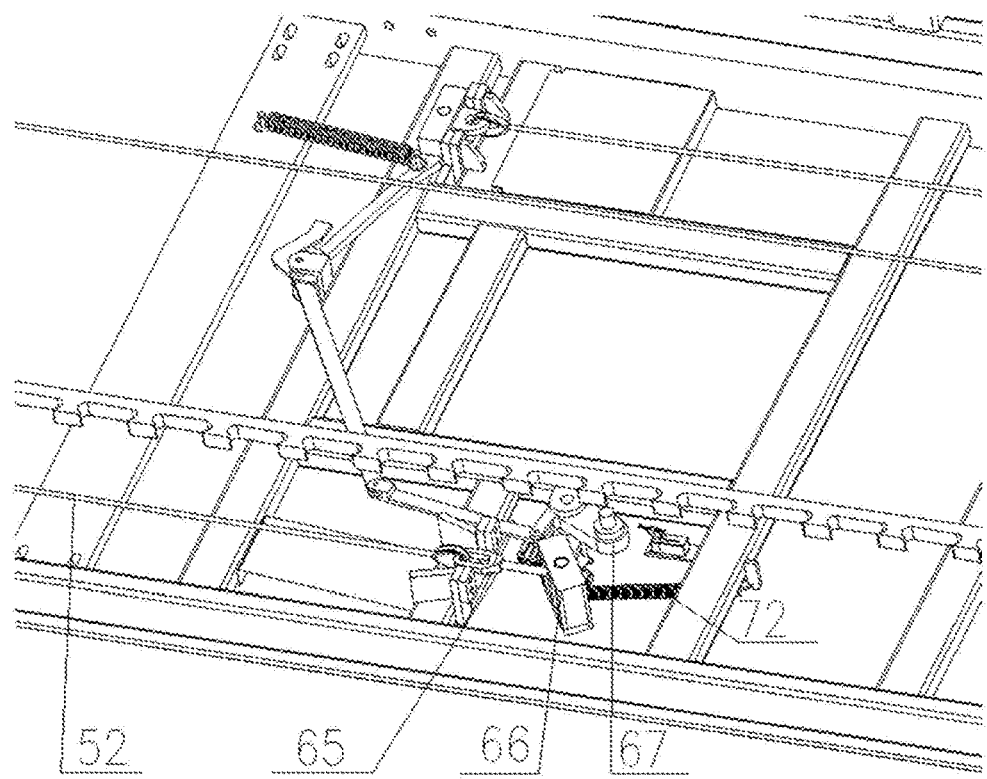
FIG. 9 is a schematic view of the tensile wire rope being relaxed.

Referring to FIG. 9, when the retracting wire rope 51 is in a tensioned state, the tensile wire rope 52 may be in a certain relaxed state under some operating conditions, but the tensile wire rope 52 is not broken and thus does not need to brake. At this time, although the tensile spring 72 may rotate the main hinged rod 66, the rotational angle of the main hinged rod 66 does not exceed the range of the angle b. Thereby, the main hinged rod 66 may not rotate the brake pin 67, to avoid the accident combination of the brake pin 67 and the brake slot 224, so as to ensure security.

Figure 10:
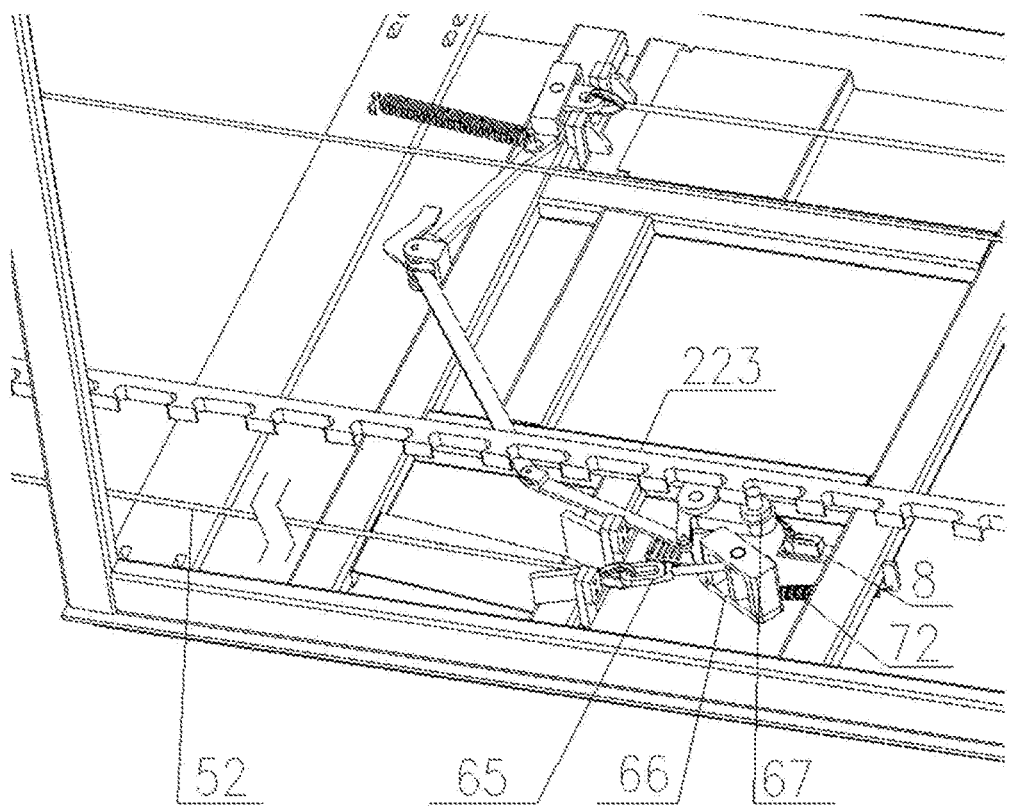
FIG. 10 is a schematic view of the tensile wire rope being broken.

Referring to FIG. 10, when the tensile wire rope 52 is broken, the tensile spring 72 drives the main hinged rod 66 to rotate beyond the range of the angle b, so that the main hinged rod 66 may start rotating the brake pin 67, and finally the brake pin 67 and the brake slot 224 on the brake plate 223 are combined with each other, to brake the first tunnel and the second tunnel.

Referring to FIG. 4, a travel switch 8 may also be disposed at the second tunnel. The travel switch is used to detect whether the brake pin 67 is combined with the brake slot 224 or not. When the brake pin 67 is combined with the brake slot 224, the brake pin 67 may just trigger the travel switch 8. The travel switch 8 is triggered to generate a detection signal which can be transmitted to a control system of the passenger boarding bridge. After receiving the detection signal, the control system may stop movement of a lifting column and a horizontal drive unit.

The movable tunnel braking system of the present disclosure, a braking process may be completely realized by means of a mechanical structure, without using any electrical component, to avoid unreliability of the electrical components. The electrical components only play an auxiliary function of transmitting detection signals to the control system of the passenger boarding bridge. Thus, the movable tunnel braking system has an extremely high reliability, and can be braked reliably even in the event of an unexpected power failure.

The embodiment of the present disclosure further discloses a passenger boarding bridge having the movable tunnel braking system, which may have three or more tunnels.

While the present disclosure has been described in detail in connection with the exemplary embodiments, it should be readily understood that the present disclosure is not limited to such disclosed embodiments. Rather, various alternations and equivalents of such metes and bounds are therefore intended to be embraced by the appended claims.

What is claimed is:

1. An movable tunnel braking system for a passenger boarding bridge, the passenger boarding bridge comprising a plurality of tunnels sleeve-connected sequentially and a tensile wire rope and a retracting wire rope that are connected to the plurality of tunnels, wherein the movable tunnel braking system comprises:
   a brake plate that is fixedly disposed at a first tunnel of the plurality of tunnels, and the brake plate is provided with a plurality of brake slots;
   a brake pin that is movably disposed at a second tunnel of the plurality of tunnels, which is sleeve-connected with the first tunnel and configured to be combined with the brake slot; and
   a triggering device, comprising:
      a mechanical blocking portion that is fixedly disposed at the second tunnel;
      a linkage mechanism that is movably disposed at the second tunnel, and is connected to one end of the tensile wire rope or the retracting wire rope, and the linkage mechanism abuts against the mechanical blocking portion under action of a tension of the tensile wire rope or the retracting wire rope; and a tensile spring that has two ends respectively connected to the linkage mechanism and the second tunnel, so that when the tensile wire rope or the retracting wire rope is broken, the linkage mechanism is driven to move and drives the brake pin to combine with the brake slot, to brake the first tunnel and the second tunnel.

2. The movable tunnel braking system according to claim 1, wherein the brake pin is hinged to the second tunnel; two brake pins and two triggering devices are provided; the two linkage mechanisms of the two triggering devices are connected to one end of the tensile wire rope and the retracting wire rope, respectively; and the two linkage mechanisms of the two triggering devices are connected to one of the brake pins, respectively.

3. The movable tunnel braking system according to claim 1, wherein the brake slot is a waist-shaped slot, a circular slot, a square slot, a trapezoidal slot or a V-shaped slot.

4. The movable tunnel braking system according to claim 1, further comprising a travel switch for detecting whether the brake pin is combined with the brake slot.

5. The movable tunnel braking system according to claim 1, wherein the brake pin is hinged to the second tunnel; the second tunnel is provided with a positioning spring that provides a pulling force for the brake pin to disconnect the brake pin from the brake slot; the triggering device is provided with two; the two linkage mechanisms of the two triggering devices are connected to one end of the tensile wire rope and the retracting wire rope, respectively; and the two linkage mechanisms of the two triggering devices are connected to the same brake pin.

6. The movable tunnel braking system of claim 5, wherein the linkage mechanism comprises:

a main hinged rod that has one end coaxially hinged with the brake pin and the other end in contact with the mechanical blocking portion, and the main hinged rod being connected to the tensile spring;

an intermediate hinged shaft that is hinged to the main hinged rod; and a connecting bolt that has one end connected to the tensile wire rope or the retracting wire rope and the other end connected to the intermediate hinged shaft.

7. The movable tunnel braking system according to claim 6, wherein the main hinged rod comprises a body and a connecting handle disposed at one end of the body; the connecting handle is coaxially hinged with the brake pin; the body is configured to be rotated by a certain angle to contact with the brake pin so as to drive the brake pin to be combined with the brake slot.

8. The movable tunnel braking system of claim 7, wherein the certain angle is in a range of 5° to 30°.

9. The movable tunnel braking system of claim 5, wherein the linkage mechanism comprises:

a first hinged seat that is fixedly disposed at the second tunnel;

a first hinged rod that is connected to the tensile wire rope or the retracting wire rope;

a second hinged rod that has one end hinged to the first hinged seat and the other end hinged to the first hinged rod and capable of abutting against the mechanical blocking portion, the tensile spring being connected to the second hinged rod;

a third hinged rod having one end hinged to the first hinged seat;

a fourth hinged rod having two ends respectively hinged to the third hinged rod and the brake pin; wherein the second hinged rod is configured to be rotated by a certain angle to drive the third hinged rod to rotate, such that the third hinged rod drives the fourth hinged rod to move, and the fourth hinged rod drive the brake pin to combine with the brake slot.

10. The movable tunnel braking system of claim 9, wherein the certain angle is in a range of 5° to 30°.

11. A passenger boarding bridge, comprising the movable tunnel braking system, the passenger boarding bridge comprises a plurality of tunnels sleeve-connected sequentially and a tensile wire rope and a retracting wire rope that are connected to the plurality of the tunnels, wherein the movable tunnel braking system comprises:

a brake plate that is fixedly disposed at a first tunnel of the plurality of tunnels, and the brake plate is provided with a plurality of brake slots;

a brake pin that is movably disposed at a second tunnel of the plurality of tunnels, which is sleeve-connected with the first tunnel and configured to be combined with the brake slot; and a triggering device, comprising:

a mechanical blocking portion that is fixedly disposed at the second tunnel;

a linkage mechanism that is movably disposed at the second tunnel, and is connected to one end of the tensile wire rope or the retracting wire rope, and the linkage mechanism abuts against the mechanical blocking portion under action of a tension of the tensile wire rope or the retracting wire rope; and a tensile spring that has two ends respectively connected to the linkage mechanism and the second tunnel, so that when the tensile wire rope or the retracting wire rope is broken, the linkage mechanism is driven to move and drives the brake pin to combine with the brake slot, to brake the first tunnel and the second tunnel.

12. The passenger boarding bridge according to claim 11, wherein the passenger boarding bridge has three tunnels.

\* \* \* \* \*